(12) United States Patent
Sunaga

(10) Patent No.: US 10,133,517 B2
(45) Date of Patent: Nov. 20, 2018

(54) STORAGE CONTROL DEVICE

(71) Applicant: FUJITSU LIMITED, Kawasaki-shi, Kanagawa (JP)

(72) Inventor: Kazuyuki Sunaga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 144 days.

(21) Appl. No.: 15/189,304

(22) Filed: Jun. 22, 2016

(65) Prior Publication Data

US 2017/0046070 A1 Feb. 16, 2017

(30) Foreign Application Priority Data

Aug. 11, 2015 (JP) ................. 2015-158692

(51) Int. Cl.
*G06F 3/06* (2006.01)

(52) U.S. Cl.
CPC .......... *G06F 3/0688* (2013.01); *G06F 3/0616* (2013.01); *G06F 3/0631* (2013.01)

(58) Field of Classification Search
CPC ..... G06F 3/0616; G06F 3/0631; G06F 3/0688
See application file for complete search history.

(56) References Cited

U.S. PATENT DOCUMENTS

| | | | |
|---|---|---|---|
| 6,092,221 A | 7/2000 | Hiratsuka | |
| 7,526,623 B1 * | 4/2009 | Rao | G06F 12/023 711/159 |
| 2007/0168634 A1 * | 7/2007 | Morishita | G06F 3/0608 711/170 |
| 2008/0005508 A1 * | 1/2008 | Asano | G06F 3/0605 711/161 |
| 2008/0065815 A1 | 3/2008 | Nasu et al. | |
| 2009/0287878 A1 | 11/2009 | Yamamoto et al. | |
| 2011/0252214 A1 * | 10/2011 | Naganuma | G06F 3/0607 711/170 |
| 2012/0131381 A1 * | 5/2012 | Eleftheriou | G06F 3/0616 714/6.3 |

FOREIGN PATENT DOCUMENTS

| | | |
|---|---|---|
| JP | 11-73378 | 3/1999 |
| JP | 2008-70935 | 3/2008 |
| JP | 2009-301525 | 12/2009 |

* cited by examiner

*Primary Examiner* — Aracelis Ruiz
(74) *Attorney, Agent, or Firm* — Staas & Halsey LLP

(57) ABSTRACT

A storage control device includes a memory device and a processor. The memory device stores therein management information representing a relationship of a total amount of writable data within a warranty period of a storage device with respect to a user capacity of the storage device. The processor acquires a current user capacity and a current spare capacity from the storage device. The processor predicts, at a predetermined timing, a maximum write amount within the warranty period on basis of an accumulated amount of data written into the storage device and an operation time of the storage device. The processor restricts, when the user capacity is extended using the spare capacity, an extension amount of the user capacity on basis of the management information such that a total amount of writable data after the extension of the user capacity does not become less than the maximum write amount.

8 Claims, 14 Drawing Sheets

FIG.6

RAID MANAGEMENT TABLE 111

| RAID GROUP ID | DRIVE ID | RAID TYPE | USER CAPACITY | LOGICAL CAPACITY | SPARE CAPACITY | TBW |
|---|---|---|---|---|---|---|
| G1 | D1 | RAID5 | 400GB | 800GB | 112GB | 7.3PB |
| | D2 | | 400GB | | 112GB | 7.3PB |
| | D3 | | 400GB | | 112GB | 7.3PB |
| G2 | D4 | RAID6 | 400GB | 1.2TB | 112GB | 7.3PB |
| | D5 | | 400GB | | 112GB | 7.3PB |
| | D6 | | 400GB | | 112GB | 7.3PB |
| | D7 | | 400GB | | 112GB | 7.3PB |
| | D8 | | 400GB | | 112GB | 7.3PB |
| ... | ... | ... | ... | ... | ... | ... |
| SPARE SP1 | D9 | — | 400GB | — | 112GB | 7.3PB |
| ... | ... | ... | ... | ... | ... | ... |

FIG.7

| TBW MANAGEMENT TABLE | | | 112<br>112a<br>112b |
|---|---|---|---|
| DRIVE ID | USER CAPACITY | TBW | |
| D1 | 400GB | 7.3PB | |
| | ... | ... | |
| | 480GB | 0.88PB | |
| | ... | ... | |

FIG.9

| EXTENSION LIMIT MANAGEMENT TABLE | | 113 |
|---|---|---|
| RAID GROUP ID | UPPER LIMIT OF EXTENSION AMOUNT PER SSD | |
| G1 | 80GB | |
| ... | ... | |

US 10,133,517 B2

STORAGE CONTROL DEVICE

CROSS-REFERENCE TO RELATED APPLICATION

This application is based upon and claims the benefit of priority of the prior Japanese Patent Application No. 2015-158692, filed on Aug. 11, 2015, the entire contents of which are incorporated herein by reference.

FIELD

The embodiments discussed herein are related to a storage control device.

BACKGROUND

A storage apparatus is currently being used in data preservation. The storage apparatus is equipped with a plurality of storage devices such as hard disk drives (HDDs) or solid state drives (SSDs) making it possible to use a large capacity storage area. The storage apparatus is connected to a storage control device which performs access control of data writing or data reading for the storage device. The storage apparatus may have a built-in storage control device.

There is a storage device such as, for example, the SSD which has limitations on the number of times of writing to a built-in storage element. In such a storage device, a control process called "wear leveling" designed to extend a product lifetime, may be performed. In the wear leveling, a portion of a physical storage area of the storage device is secured as a spare capacity for wear leveling. The storage device distributes the writing by using the spare capacity in order not to allow the writing to be concentrated on a specific storage area allocated to a user. With this, it may be possible to achieve leveling of the number of times that each storage element undergoes the writing and extend the product lifetime of a storage device. The storage area secured as the spare capacity is made invisible to the user by, for example, firmware of the storage device.

For example, in a storage apparatus equipped with a flash memory, there is a suggestion that a capacity of an alternative area is set by taking the restrictions on the number of times of erasure in the flash memory into account to improve a useful lifetime of the storage area configured by the flash memory. Additionally, there is a suggestion that a logical volume data is completely erased using a chip erasure function of the flash memory when intending to completely erase data of a logical volume such that an increase of the number of times of rewriting data is suppressed and the durable lifetime of a flash memory drive is prolonged compared with a case of executing an erasure method of performing a data overwriting a plurality of times. Furthermore, regarding the flash memory, a method is considered for calculating the number of rewritable times during the lifetime, on the basis of a ratio of the number of valid sectors of a reserved area and the number of sectors that have been and are being used.

Related techniques are disclosed in, for example, Japanese Laid-Open Patent Publication No. 2009-301525, Japanese Laid-Open Patent Publication No. 2008-070935, and Japanese Laid-Open Patent Publication No. 11-073378.

As described above, there is a storage device (e.g., SSD) provided with the spare capacity for wear leveling. In this regard, it may be considered that user capacity may be extended using the spare capacity. However, the size of the spare capacity affects a total amount of writable data (TBW: Total Bytes Written) within a warranty period of the storage device. Specifically, the TBW is increased as the spare capacity becomes larger with respect to the user capacity, and the TBW is decreased as the spare capacity becomes smaller with respect to the user capacity. For that reason, there is a possibility that an accumulated amount of data written into the storage device may exceed the TBW depending on an amount of the writing actually performed onto the storage device. When the accumulated amount of written data exceeds the TBW, there is a problem that the reliability of data preservation in the storage device may be decreased.

SUMMARY

According to an aspect of the present invention, provided is a storage control device including a memory device and a processor. The memory device is configured to store therein management information representing a relationship of a total amount of writable data within a warranty period of a storage device with respect to a user capacity of the storage device. The user capacity is to be allocated to a user. The processor is configured to acquire a current user capacity and a current spare capacity from the storage device. The processor is configured to predict, at a predetermined timing, a maximum write amount within the warranty period on basis of an accumulated amount of data written into the storage device and an operation time of the storage device. The processor is configured to restrict, when the user capacity is extended using the spare capacity, an extension amount of the user capacity on basis of the management information such that a total amount of writable data after the extension of the user capacity does not become less than the maximum write amount.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a RAID management table;

FIG. 7 is a diagram illustrating an example of a TBW management table;

FIG. 9 is a diagram illustrating an example of an extension limit management table;

DESCRIPTION OF EMBODIMENTS

Hereinafter, descriptions will be made on the embodiments with reference to accompanying drawings.

First Embodiment

Figure 1:
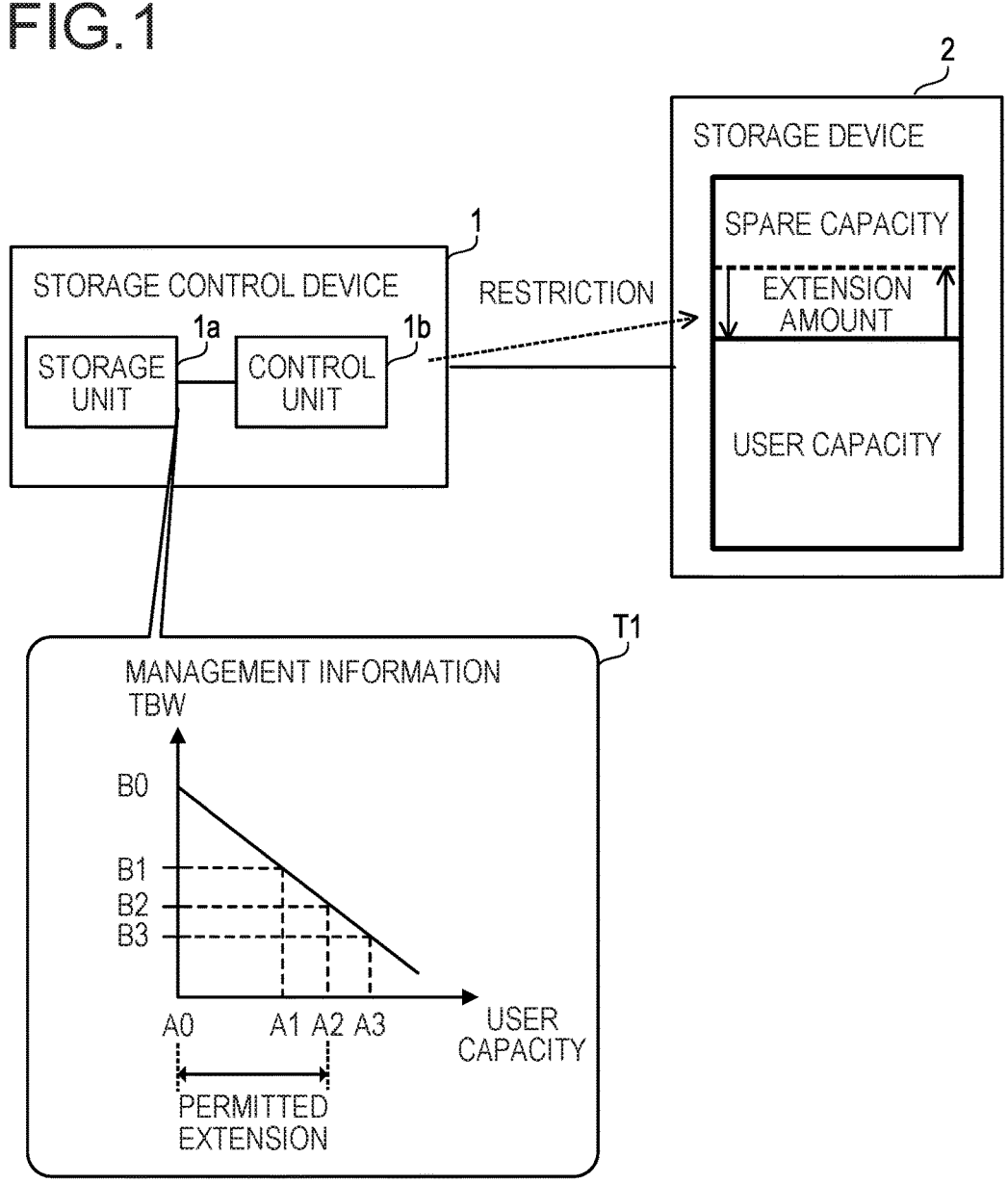
FIG. 1 is a diagram illustrating a storage control device of a first embodiment.

FIG. 1 is a diagram illustrating a storage control device of a first embodiment. The storage control device 1 controls a data access to a storage device 2. The storage device 2 is a storage device having an upper limit for the number of times of writing and is, for example, an SSD. The storage control device 1 may also be referred to as a controller module or simply a controller.

A total capacity of storage areas of the storage device 2 includes a spare capacity and a user capacity (both are quantities represented by unit of data amount such as a byte). The spare capacity is a storage capacity for wear leveling in the storage device 2. In an initial stage, a storage area having a predetermined size is secured as the spare capacity. The user capacity is a storage capacity allocated to a user as an area in which data is capable of being stored by the user.

When a free capacity other than the spare capacity is present in the storage device 2, a portion of the free capacity may be allocated as a user capacity to extend the user capacity. However, when the free capacity is insufficient, it is unable to allocate a sufficient capacity to the user capacity by the free capacity alone. For this, the storage control device 1 provides a function of allocating the user capacity also from the spare capacity.

The storage control device 1 includes a storage unit 1a and a control unit 1b. The storage unit 1a may be a volatile storage device such as a random access memory (RAM) or a non-volatile storage device such as a flash memory. The control unit 1b is, for example, a processor. The processor may include, for example, a central processing unit (CPU), a digital signal processor (DSP), an application specific integrated circuit (ASIC), and a field programmable gate array (FPGA). The control unit 1b may be a multiprocessor.

The storage unit 1a stores therein a management information T1 representing a relationship of a total amount of writable data (TBW) within a warranty period of the storage device 2 with respect to the user capacity and the spare capacity to be allocated to the user of the storage device 2. The management information T1 is information representing a correlation of the user capacity with the TBW in a case where the user capacity is allocated from the spare capacity. The TBW is a total amount of writable data guaranteed within a warranty period of the storage device 2 as a product.

In FIG. 1, the contents of the management information T1 are illustrated by a graph. An origin of the graph represents that a storage capacity allocated from the spare capacity to the user capacity is "0". For example, the symbols "A0", "A1", "A2", and "A3" (A0<A1<A2<A3) are illustrated as the user capacities in the horizontal axis of the graph. The symbol "A0" represents the user capacity before extension of the user capacity using the spare capacity is performed (a state where the spare capacity is the largest). The symbols "A1", "A2", and "A3" are values of the user capacity after the extension is performed by allocating portions of the spare capacity. That is, the spare capacity becomes smaller as the user capacities "A1", "A2", and "A3" become larger in this order.

In the vertical axis of the graph in FIG. 1, the symbols "B0", "B1", "B2", and "B3" (B0>B1>B2>B3) are illustrated as values of the TBW (e.g., a quantity represented by unit of data amount such as a byte). The symbol "B0" represents the TBW when the user capacity is "A0". According to the management information T1, it is found that the TBW is decreased as the extension amount becomes larger when the user capacity is extended using the spare capacity.

The control unit 1b acquires the current user capacity and the current spare capacity from the storage device 2. With this, the control unit 1b checks how the capacity of the storage device 2 is configured at present. The control unit 1b predicts a maximum write amount within the warranty period for the storage device 2 on the basis of an accumulated amount of written data and an operation time of the storage device 2 at a predetermined timing. The predetermined timing may be a periodic timing such as, for example, once per day and otherwise, a timing depending on a ratio of an amount of data stored in the user capacity to the user capacity (e.g., timing at which 80% of the user capacity has been used). The control unit 1b may acquire information of, for example, the accumulated amount of written data, the operation time, and the warranty period (e.g., 5 years or 10 years) from the storage device 2. The control unit 1b predicts the maximum write amount within the warranty period by the following Equation (1).

$$\text{maximum write amount} = \text{accumulated amount of written data} \times (\text{warranty period/operation time}) \quad (1)$$

When the user capacity is extended using the spare capacity, the control unit 1b restricts the extension amount such that a total amount of writable data (TBW) after the extension does not become lower than the maximum write amount on the basis of the management information T1 stored in the storage unit 1a.

For example, a case where the current user capacity is "A0" and the maximum write amount predicted by Equation (1) is "B2", is assumed. In this case, the TBW for the user capacity "A1" is "B1". Here, B1 is larger than B2 (i.e., B1>B2). That is, the TBW exceeds the predicted maximum write amount within the warranty period. Accordingly, the extension of the user capacity to the "A1" is permitted (in this case, the extension amount is "A1−A0" (a difference between "A1" and "A0")).

The TBW for the user capacity "A3" is "B3". Here, B3 is smaller than B2 (i.e., B3<B2). That is, the TBW is lower than the predicted maximum write amount within the warranty period. Accordingly, the extension of the user capacity to the "A3" is not allowed.

In this case, the extension of user capacity using the spare capacity is allowed up to the user capacity "A2". This is because when the user capacity is "A2", the predicted maximum write amount "B2" is coincident with the TBW of "B2" and the TBW is not lower than the predicted maximum write amount within the warranty period. That is, when the upper limit of the extension amount, which is permitted when the user capacity is extended using the spare capacity, is set to "A2−A0", the TBW does not become lower than the predicted maximum write amount within the warranty period. For that reason, the control unit 1b restricts the extension amount for a case where the user capacity is extended using the spare capacity to be less than or equal to "A2−A0".

With this, reliability of the data preservation may be maintained. When the user capacity is extended using the spare capacity for wear leveling, the TBW is decreased accompanied by the reduction of the spare capacity in the storage device 2, which is problematic. This is because there is a concern that when the user capacity is extended without limitation using the spare capacity, the TBW is reduced and the number of times of writing to the storage elements of the storage device 2 may exceed the upper limit of the number of times permitted for the storage element. When the writing is performed for a number of times exceeding the upper limit of the number of times permitted for the storage element, a possibility that data stored using the storage element is lost or a normal writing is not able to be performed on the storage element is increased. For that reason, the reliability of the data preservation for the storage device 2 is decreased.

Thus, the storage control device 1 limits the extension amount such that the TBW does not become lower than the predicted maximum write amount within the warranty period in consideration of the reduction of the TBW accompanied by the decrease of the spare capacity when the user capacity is extended using the spare capacity for wear leveling. Accordingly, it is possible to reduce the possibility that the number of times of writing to the storage element of the storage device 2 exceeds the upper limit of the number of times permitted for the storage element in operation after extension of the user capacity. For that reason, it is possible to reduce the possibility that data is lost or the writing is not performed with respect to the storage element and maintain the reliability of the data preservation by the storage device 2.

Second Embodiment

Figure 2:
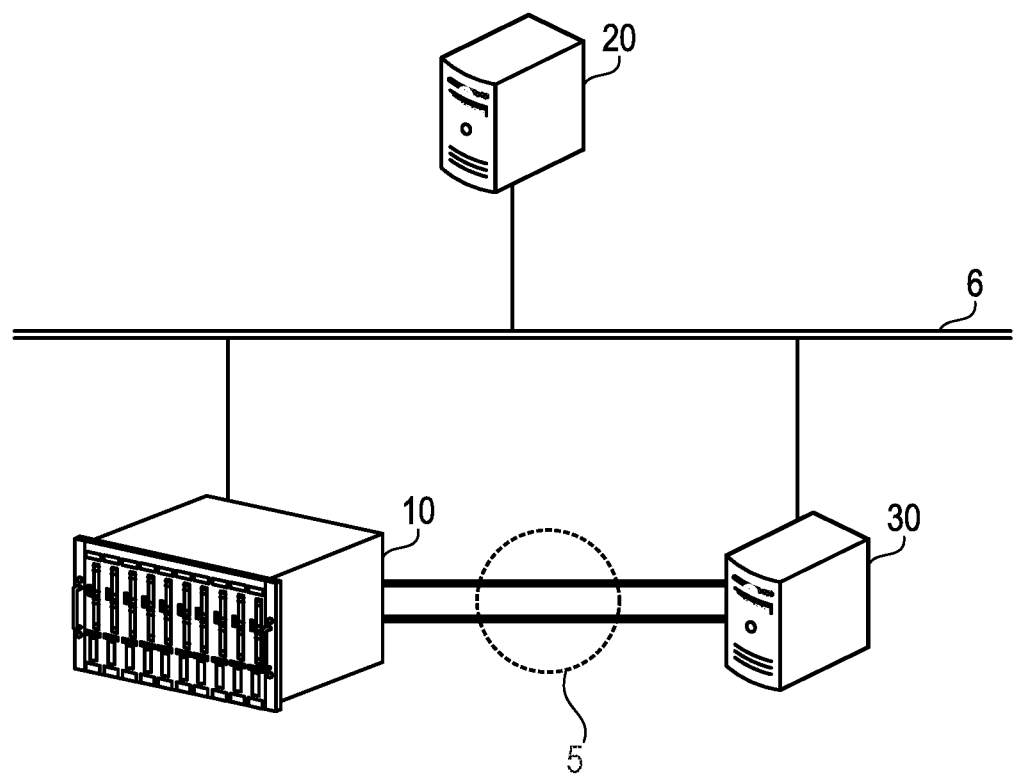
FIG. 2 is a diagram illustrating an information processing system of a second embodiment.

FIG. 2 is a diagram illustrating an information processing system according to a second embodiment. The information processing system according to the second embodiment includes a storage apparatus 10, a management server 20, and a business server 30. The storage apparatus 10 and the business server 30 are connected to a storage area network (SAN) 5. The SAN 5 is a network suitable for a high speed access for the storage apparatus 10. The storage apparatus 10, the management server 20, and the business server 30 are connected to a local area network (LAN) 6. The LAN 6 is a network used in the operation management for the storage apparatus 10 and the business server 30 by the management server 20.

The storage apparatus 10 has a plurality of SSDs built therein and stores therein data used for processing performed by the business server 30. When a write command of data is received from the business server 30, the storage apparatus 10 writes the data in the built-in SSD. The storage apparatus 10 transmits a result of the writing to the business server 30. When a read command of data is received from the business server 30, the storage apparatus 10 reads the data from the built-in SSD and transmits the read data to the business server 30. The HDD together with the SSD may have been built in the storage apparatus 10.

The management server 20 is a server computer to perform operation management of the storage apparatus 10. The management server 20 performs setting of operation control on the storage apparatus 10 through, for example, the LAN 6. The management server 20 may transmit a program (e.g., firmware program) to be executed by the storage apparatus 10 to the storage apparatus 10 through the LAN 6.

The business server 30 is a server computer which accesses data stored in the storage apparatus 10. The business server 30 executes a program of a business application and provides a business processing service to a user.

Figure 3:
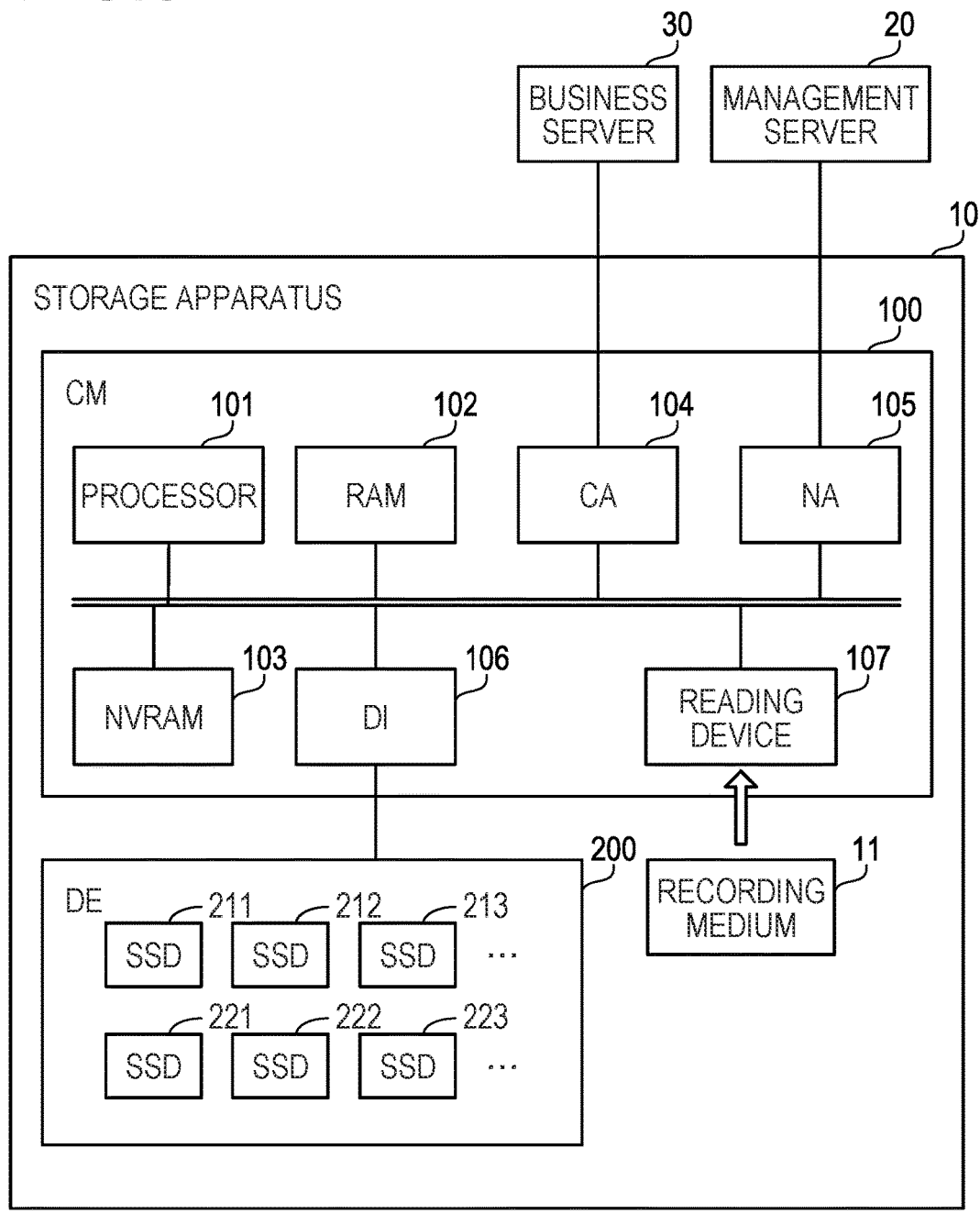
FIG. 3 is a diagram illustrating an example of hardware of a storage apparatus.

FIG. 3 is a diagram illustrating an example of hardware of the storage apparatus. The storage apparatus 10 includes a controller module (CM) 100 and a drive enclosure (DE) 200. The CM 100 controls a data access to the DE 200 in response to a request from the business server 30. The CM 100 combines a plurality of SSDs (or HDDs) built in the DE 200 to prepare a logical volume and allocates the logical volume to the user. The CM 100 provides a graphical user interface (GUI) for the operation management to a web browser of the management server 20. For example, a system administrator may manipulate the GUI displayed by the web browser of the management server 20 and instruct the CM 100 to extend the size of the logical volume to be allocated to the user. The CM 100 is an example of the storage control device 1 of the first embodiment.

The CM 100 includes a processor 101, a RAM 102, a non-volatile RAM (NVRAM) 103, a channel adapter (CA) 104, a network adapter (NA) 105, a drive interface (DI) 106, and a reading device 107.

The processor 101 controls information processing of the CM 100. The processor 101 may be a multiprocessor. The processor 101 is, for example, a CPU, a DSP, an ASIC, or an FPGA. The processor 101 may be a combination of two or more of the CPU, the DSP, the ASIC, and the FPGA.

The RAM 102 is a main storage device of the CM 100. The RAM 102 temporarily stores therein at least a portion of the firmware program to be executed by the processor 101. The RAM 102 stores therein various data used for the processing performed by the processor 101.

The NVRAM 103 is an auxiliary storage device of the CM 100. The NVRAM 103 is, for example, a non-volatile semiconductor memory. The NVRAM 103 stores therein, for example, a firmware program or various data.

The CA 104 is an interface for communicating with the business server 30 through the SAN 5. For example, an interface such as the internet small computer system Interface (iSCSI) or a fibre channel (FC) may be used as the CA 104.

The NA 105 is an interface for communicating with the management server 20 through the LAN 6. For example, an interface such as the Ethernet (registered trademark) may be used as the NA 105.

The DI 106 is an interface for communicating with the DE 200. For example, an interface such as the serial attached SCSI (SAS) may be used as the DI 106.

The reading device 107 is a device to read a program or data recorded in a portable recording medium 11. A non-volatile semiconductor memory such as, for example, a flash memory may be used as the recording medium 11. For example, the reading device 107 may store, in the RAM 102 or the NVRAM 103, the program or data read from the recording medium 11 in accordance with instructions from the processor 101.

The DE 200 includes SSDs 211, 212, 213, . . . and SSDs 221, 222, 223, . . . . The SSDs 211, 212, 213, . . . are storage devices allocated to the user (already being used as the user capacity). The SSDs 221, 222, 223, . . . are storage devices not yet allocated to the user. The SSDs 221, 222, 223, . . . are spare storage devices to be used in addition to or in place of the SSDs 211, 212, 213, . . . .

The CM 100 combines a plurality of SSDs built in the DE so as to prepare a logical volume using a redundant array of inexpensive disks (RAID) technology and provides the logical volume to the user. A set of SSDs forming a certain logical volume may be referred to as a RAID group. A single RAID group includes one or more logical volumes to be accessed by the business server 30. A logical unit number (LUN) identifying a logical volume is allocated to the logical volume. For example, the business server 30 designates the LUN and a logical block address (LBA) of the logical volume and performs the data access to the storage apparatus 10. In this case, the size of the logical volume allocated from the RAID group becomes the user capacity. In the following description, it is assumed that the free capacity (a storage area not allocated as user capacity) other than the spare capacity is not present in each RAID group.

Figure 4:
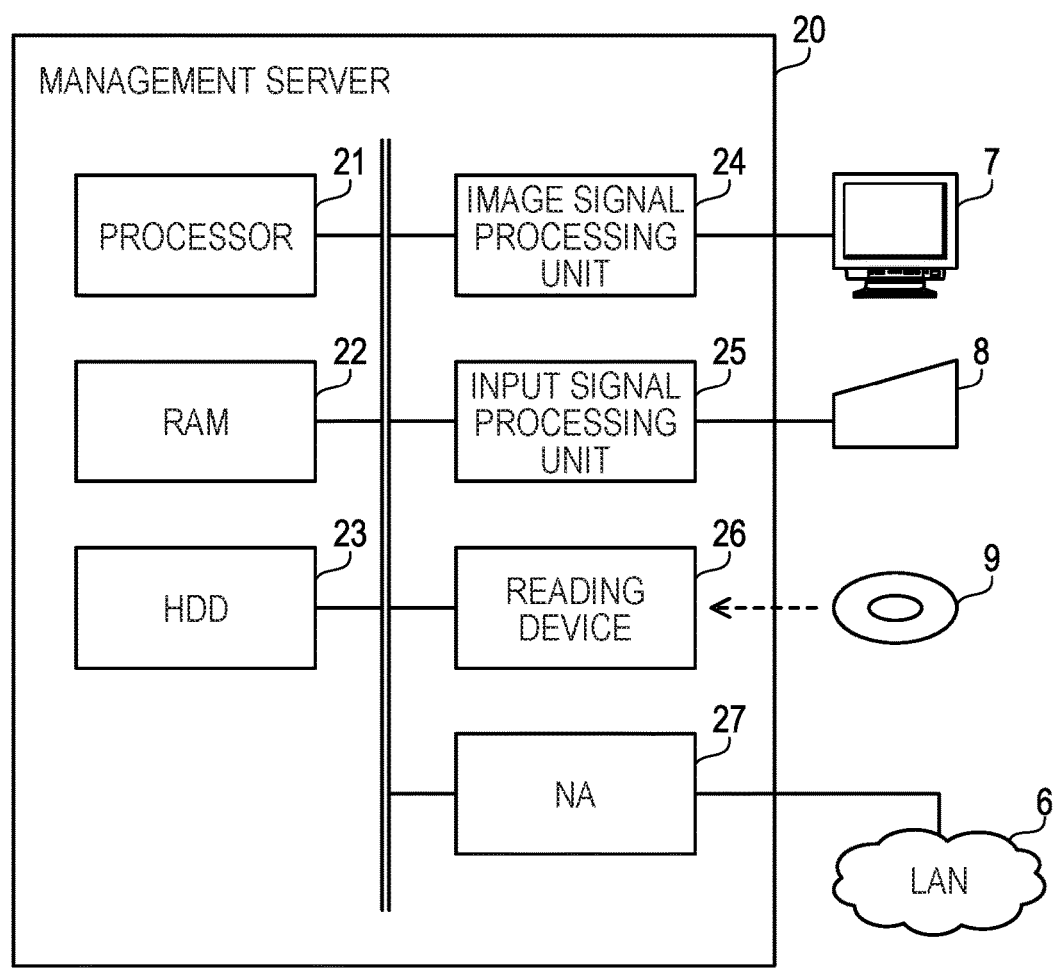
FIG. 4 is a diagram illustrating an example of hardware of a management server.

FIG. 4 is a diagram illustrating an example of hardware of the management server. The management server 20 includes a processor 21, a RAM 22, an HDD 23, an image signal processing unit 24, an input signal processing unit 25, a reading device 26, and a NA 27. Respective units are connected to a bus of the management server 20. The business server 30 is also realized by hardware similar to the management server 20.

The processor 21 controls information processing of the management server 20. The processor 21 may be a multiprocessor. The processor 21 is, for example, a CPU, a DSP, an ASIC, or an FPGA. The processor 21 may be a combination of two or more of the CPU, the DSP, the ASIC, and the FPGA.

The RAM 22 is a main storage device of the management server 20. The RAM 22 temporarily stores therein at least a portion of an operating system (OS) program or an application program to be executed by the processor 21. The RAM 22 stores therein various data used for the processing performed by the processor 21.

The HDD 23 is an auxiliary storage device of the management server 20. The HDD 23 magnetically performs data writing and data reading with respect to the built-in magnetic disk. The HDD 23 stores an OS program, an application program, and various data. The management server 20 may be provided with another type of the auxiliary storage device such as the flash memory, or the SSD, or provided with a plurality of auxiliary storage devices.

The image signal processing unit 24 outputs an image to a display 7 connected to the management server 20 in accordance with the instruction form the processor 21. For example, a cathode ray tube (CRT) display or a liquid crystal display may be used as the display 7.

The input signal processing unit 25 acquires an input signal from an input device 8 connected to the management server 20 and outputs the input signal to the processor 21. For example, a pointing device such as a mouse or a touch panel, or a keyboard may be used as the input device 8.

The reading device 26 is a device to read a program or data recorded in a recording medium 9. For example, a magnetic disk such as a flexible disk (FD) or an HDD, an optical disk such as a compact disc (CD) or a digital versatile disc (DVD), or a magneto-optical disk (MO) may be used as the recording medium 9. For example, a non-volatile semiconductor memory such as a flash memory card may be used as the recording medium 9. The reading device 26 stores, in the RAM 22 or the HDD 23, the program or data read from the recording medium 9, for example, in accordance with the instruction from the processor 21. The processor 21 may transmit the program or data (e.g., data or firmware program of the storage apparatus 10) read from the recording medium 9 to the storage apparatus 10.

Figure 5:
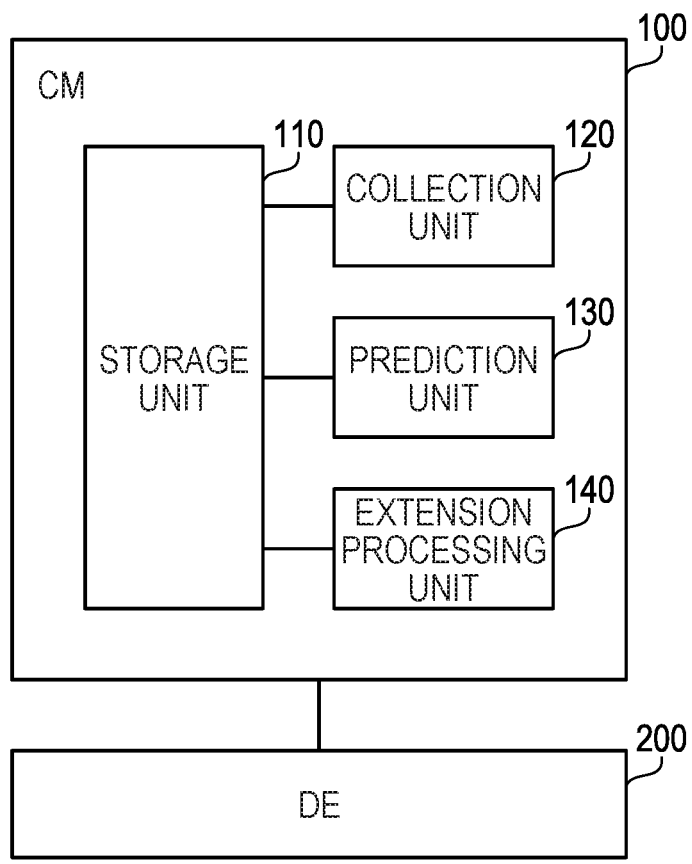
FIG. 5 is a diagram illustrating an exemplary functional configuration of a CM.

The NA 27 performs communication with other devices through the LAN 6. The NA 27 may be a wired communication interface or a wireless communication interface. FIG. 5 is a diagram illustrating an exemplary functional configuration of the CM. The CM 100 includes a storage unit 110, a collection unit 120, a prediction unit 130, and an extension processing unit 140. The storage unit 110 is realized as, for example, a storage area secured in the RAM 102 or the NVRAM 103. The collection unit 120, the prediction unit 130, and the extension processing unit 140 are realized by executing, for example, the program stored in the RAM 102 by the processor 101.

The storage unit 110 stores therein a RAID management table, a TBW management table, and an extension limit management table. The RAID management table is information for managing, for example, the user capacity of the SSD which belongs to each RAID group. The TBW management table is information for managing a correspondence between the user capacity and the TBW of each SSD. The extension limit management table is information for managing the upper limit of the extension amount of the logical volume capable of being extended using the spare capacity for the wear leveling of the SSD for each RAID group. The storage unit 110 also stores therein information of the warranty period for each SSD.

The collection unit 120 collects various specification information regarding the SSD from each SSD and stores the collected information in the storage unit 110. For example, the specification information includes sizes of the current user capacity and the current spare capacity in the SSD. For example, the specification information includes information on a correspondence of the user capacity and the spare capacity to the TBW in the SSD. Furthermore, the specification information includes information of the warranty period of the SSD.

The prediction unit 130 predicts the maximum write amount within the warranty period for each SSD. Specifically, the prediction unit 130 issues a log sense command to each SSD at a predetermined timing. With this, the collection unit 120 acquires an accumulated amount of written data from the start of operation and a total operation time from the start of operation. The accumulated amount of written data is a total amount of data written in the relevant SSD. The prediction unit 130 stores the acquired information in the storage unit 110 in association with the identification information of the SSD. The prediction unit 130 calculates the maximum write amount within the warranty period of each SSD using Equation (1). The prediction unit 130 stores the predicted result of the maximum write amount within the warranty period of each SSD in the storage unit 110 in association with the identification information of the SSD.

The extension processing unit 140 obtains the upper limit of the extension amount of the user capacity for each RAID group on the basis of the predicted result obtained by the prediction unit 130 and the TBW management table stored in the storage unit 110. The extension processing unit 140 registers the obtained upper limit of the extension amount in the extension limit management table in association with the identification information of the RAID group.

A plurality of SSDs belong to the RAID group and thus, the predicted results of the maximum write amounts within the warranty period may differ between respective SSDs. In this case, the extension processing unit 140 determines the upper limit of the extension amount of the user capacity in the relevant RAID group on the basis of an SSD having the largest value of predicted maximum write amount within the warranty period, among a plurality of SSDs that belong to the RAID group.

The extension processing unit 140 determines the extension amount (which corresponds to the extension amount which is physically extended as the user capacity in the SSD and in a case of being simply referred to as an extension amount, it indicates the physical extension amount) of the user capacity in a single SSD on the basis of the extension amount (referred to as a logical extension amount) of the logical capacity of the logical volume. Specifically, a case where the logical extension amount is X is considered. In this case, for example, the extension amount per single SSD is X/2 in RAID5 configuration formed by a combination of striping of two SSDs and parity of a single SSD (a total of three SSDs). Otherwise, the extension amount per single SSD is X/3 in RAID0 configuration formed by striping of three SSDs.

When an inquiry about the upper limit of the extension amount regarding the user capacity in a certain RAID group is received from the management server 20, the extension processing unit 140 refers to the extension limit management table stored in the storage unit 110 and replies the upper limit.

When an instruction to extend the user capacity within a range of the replied upper limit is received from the management server 20, the extension processing unit 140 performs extension of the user capacity on the basis of the spare capacity regarding each SSD that belongs to the relevant RAID group.

FIG. 6 is a diagram illustrating an example of a RAID management table. A RAID management table 111 is stored in the storage unit 110. The RAID management table 111 includes items of a RAID group identifier (ID), a drive ID, a RAID type, a user capacity, a logical capacity, a spare capacity, and a TBW.

In the item of the RAID group ID, the identification information of the RAID group is registered. In the item of the drive ID, information identifying a drive is registered. In the item of the RAID type, information identifying the RAID type is registered. In the item of the user capacity, the user capacity allocated to the SSD registered in the item of the drive ID is registered. In the item of the logical capacity, information indicating the capacity of the logical volume of the RAID group is registered. In the item of the spare capacity, information indicating the spare capacity of the SSD registered in the item of the drive ID is registered. In the item of the TBW, information indicating the TBW is registered.

For example, the information that the RAID group ID is "G1", the drive ID is "D1", the RAID type is "RAID5", the user capacity is "400 gigabytes (GB)", the logical capacity is "800 GB", the spare capacity is "112 GB", and the TBW is "7.3 petabytes (PB)", is registered in the RAID management table 111.

The information indicates that the SSD having the drive ID "D1" belongs to the RAID group having the RAID group ID "G1", the RAID type of the RAID group is "RAID5", and the logical capacity is "800 GB". The 400 GB not included in the logical capacity of the RAID group is the capacity of parity data. The information also indicates that the user capacity of the SSD having the drive ID "D1" is "400 GB", the spare capacity is "112 GB", and the TBW is "7.3 PB".

The SSDs that belong to the RAID group "G1" are the SSDs 211, 212, and 213. The drive ID of the SSD 211 is "D1". The drive ID of the SSD 212 is "D2". The drive ID of the SSD 213 is "D3".

Normally, SSDs of a common type provided by a common vendor are often used for respective SSDs that belong to the same RAID group. For that reason, the spare capacity and the TBW is the same between the SSDs. When the RAID group is prepared, the collection unit 120 collects information corresponding to the items of the RAID management table 111 from each SSD that belongs to the RAID group, generates a record regarding the RAID group, and registers the record in the RAID management table 111. The collection unit 120 may also collect information about the spare SSD from the relevant SSD and register the collected information in the RAID management table 111. For example, in the RAID management table 111, a record of the RAID group ID "spare SP1" corresponds to the record regarding the spare SSD.

FIG. 7 is a diagram illustrating an example of a TBW management table. TBW management tables 112, 112a, 112b, . . . are stored in the storage unit 110. The TBW management tables 112, 112a, 112b, . . . are provided on each SSD. The items included in the TBW management tables 112, 112a, 112b, . . . are the same and thus, in FIG. 7, descriptions will be made on the TBW management table 112 and descriptions on the TBW management tables 112a, 112b, . . . will be omitted.

The TBW management table 112 includes items of a drive ID, a user capacity, and a TBW. Information identifying a drive is registered in the item of the drive ID. Information indicating the user capacity is registered in the item of the user capacity. Information indicating the TBW is registered in the item of the TBW. A minimum value of the user capacity in the TBW management table 112 indicates a state where allocation of a portion of capacity from the spare capacity to the user capacity is not performed (spare capacity is in its full size). The TBW management table 112 (TBW management tables 112a, 112b, . . . are also similar) indicates that the user capacity may be gradually increased and the TBW is gradually reduced as the capacity to be allocated to the user capacity from the spare capacity is increased.

For example, information that the drive ID is "D1", the user capacity is "400 GB", and the TBW "7.3 PB" is registered in the TBW management table 112. The information indicates that regarding the SSD 211 having the drive ID "D1", the TBW is "7.3 PB" in a case where the user capacity is "400 GB".

For example, information that the drive ID is "D1", the user capacity is "480 GB", and the TBW "0.88 PB" is registered in the TBW management table 112. The information indicates that regarding the SSD 211 having the drive ID "D1", the TBW is "0.88 PB" in a case where the user capacity is "480 GB" (that is, the spare capacity is reduced by 80 GB for a case where the user capacity is 400 GB).

Figure 8:
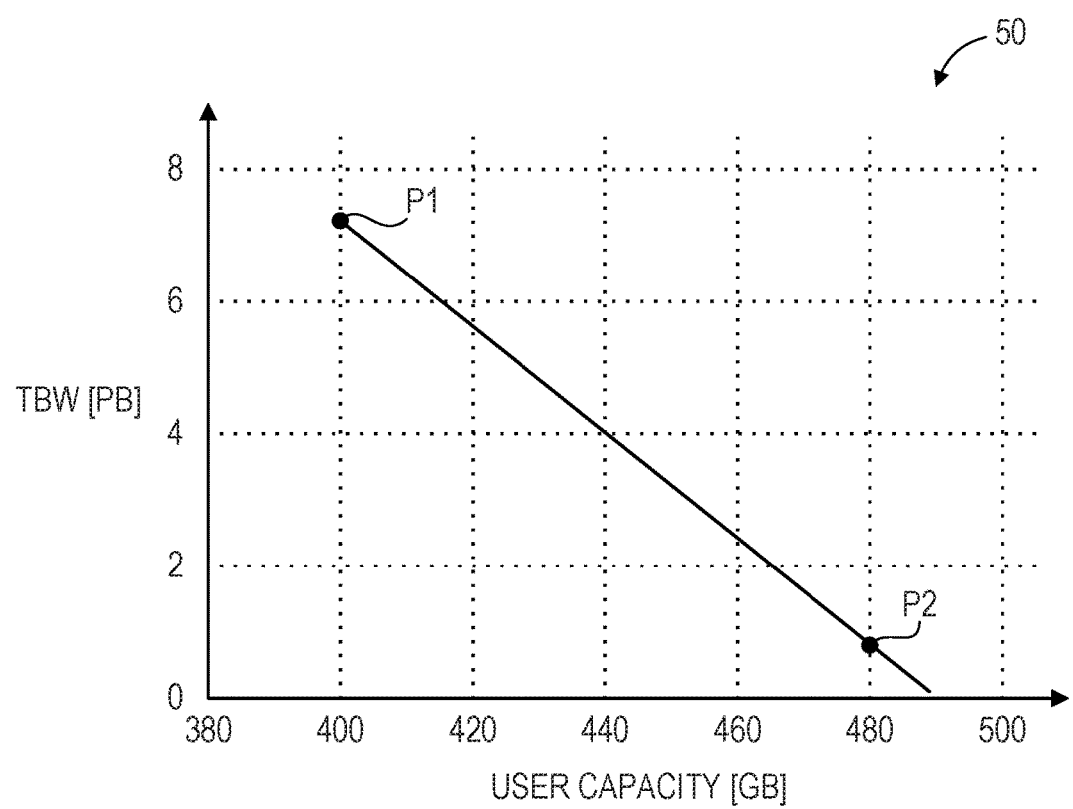
FIG. 8 is a diagram illustrating an example of correlation of user capacity with a TBW of an SSD.

FIG. 8 is a diagram illustrating an example of the correlation of a user capacity with a TBW of the SSD. A graph 50 is a graph obtained by plotting the TBW management table 112. The horizontal axis of the graph 50 indicates the user capacity (unit of GB). The vertical axis of the graph 50 indicates the TBW (unit of PB).

The point P1 is a point obtained by plotting the TBW of 7.3 PB in a case where the user capacity is 400 GB (spare capacity of 112 GB). The point P2 is a point obtained by plotting the TBW of 0.88 PB in a case where the user capacity is 480 GB (spare capacity of 32 GB).

As illustrated in the graph 50, in the SSD 211, when the user capacity is 400 GB and the spare capacity is 112 GB for the total capacity of 512 GB, the TBW becomes 7.3 PB. The TBW is gradually reduced as the portion of capacity to be allocated from the spare capacity of 112 GB to the user capacity is gradually increased (the spare capacity is gradually decreased). An increment of the user capacity (i.e., a decrement of spare capacity) is substantially proportional to the TBW (a constant of proportion is a negative value).

FIG. 9 is a diagram illustrating an example of an extension limit management table. An extension limit management table 113 is stored in the storage unit 110. The extension limit management table 113 includes items of a RAID group ID and an upper limit of extension amount per SSD.

The identification information of the RAID group is registered in the item of the RAID group ID. The information indicating the upper limit of the extension amount that may be allocated from the spare capacity to the user capacity per SSD that belongs to the RAID group is registered in the item of the upper limit of extension amount per SSD.

For example, information that the RAID group ID is "G1" and the upper limit of extension amount per SSD is "80 GB" is registered in the extension limit management table 113. The information indicates that the capacity may be allocated from the spare capacity up to the maximum of 80 GB as the user capacity regarding each SSD that belongs to the RAID group having the RAID group ID of "G1". That is, the maximum capacity that may be allocated from the spare capacity as the user capacity is limited to 80 GB per SSD in the RAID group ID "G1".

Figure 10:
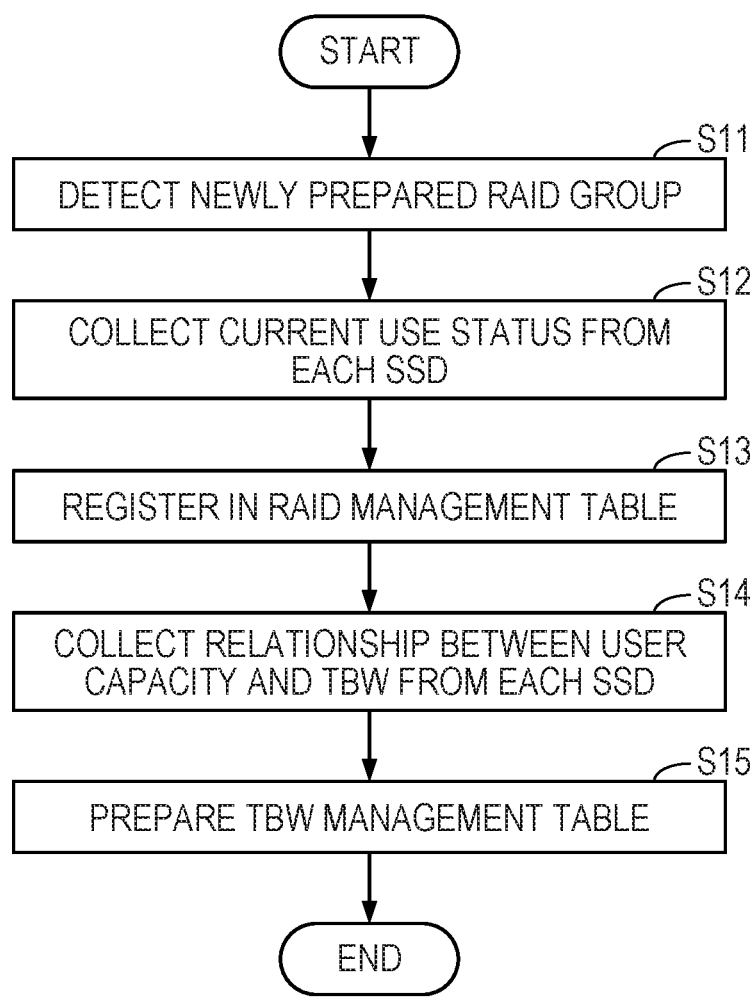
FIG. 10 is a flowchart illustrating an example of table preparation processing.

In a case where respective SSDs are not combined into a single RAID, information of the upper limit of extension amount is registered in the extension limit management table 113 for each SSD in association with the identification information of the SSD. FIG. 10 is a flowchart illustrating an example of table preparation processing. Hereinafter, the processing illustrated in FIG. 10 will be described. The processing of FIG. 10 is executed prior to the processing of FIG. 11 and FIG. 12 which will be described later.

(S11) The collection unit 120 detects a newly prepared RAID group. The collection unit 120 acquires the RAID group ID, the RAID type, and the logical capacity of the relevant RAID group.

(S12) The collection unit 120 collects the drive ID, the user capacity, the spare capacity, and the TBW of each SSD that belong to the newly prepared RAID group from each SSD.

(S13) The collection unit 120 registers the information acquired in S11 and S12 in the RAID management table 111.

(S14) The collection unit 120 collects information that indicates a relationship between the user capacity (extended using the spare capacity) and the TBW from each SSD that belongs to the RAID group detected in S11. For example, the SSD maintains the information that indicates the relationship between the user capacity and the TBW in a predetermined memory provided in the SSD of its own in advance.

(S15) The collection unit 120 prepares the TBW management table, in which the information indicating the relationship between the user capacity and the TBW collected in S14 is registered, for each SSD. The collection unit 120 stores the prepared TBW management table in the storage unit 110. Then, the processing is ended.

Figure 11:
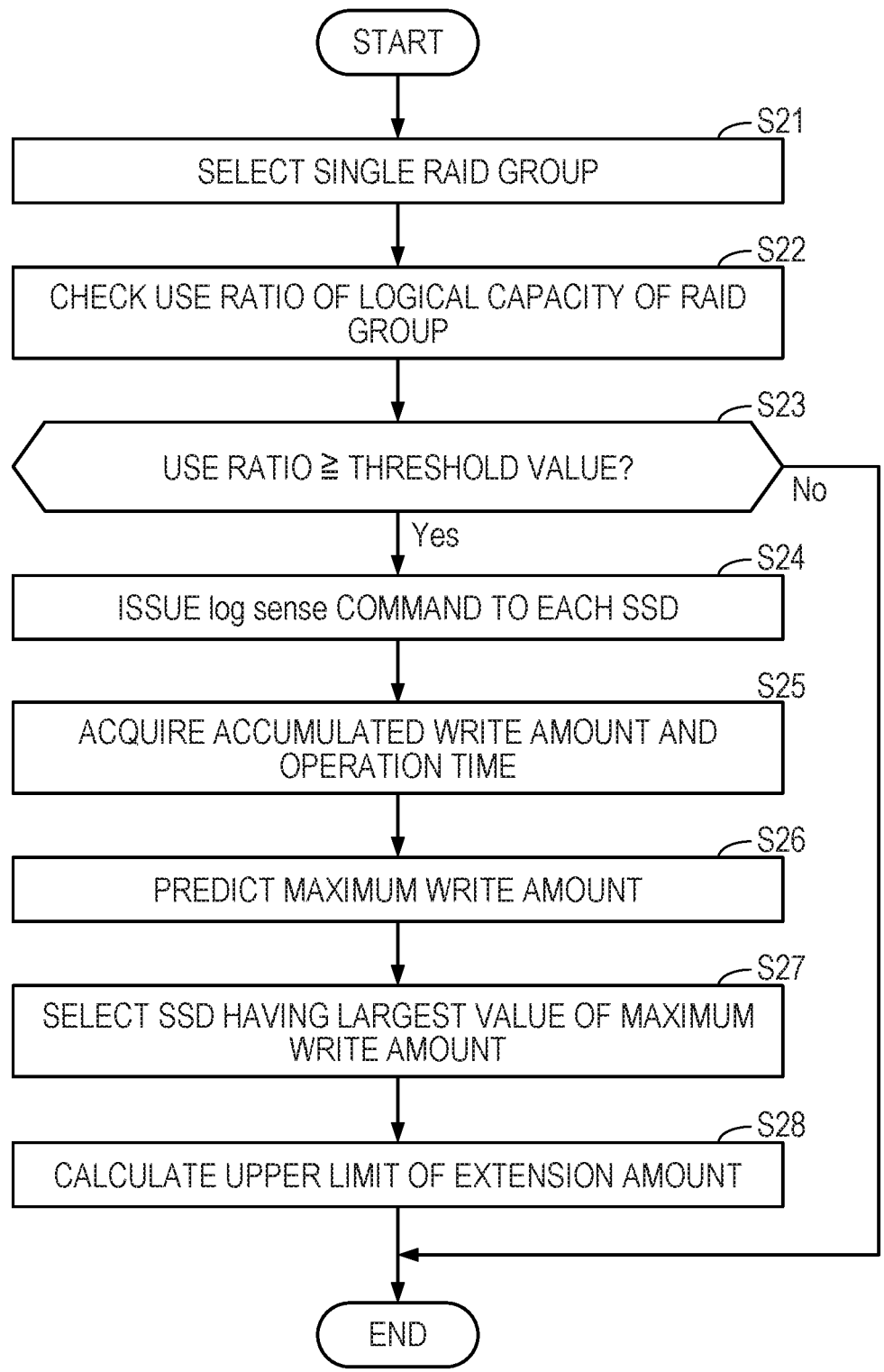
FIG. 11 is a flowchart illustrating an example of extension limit determination processing.

FIG. 11 is a flowchart illustrating an example of extension limit determination processing. Hereinafter, the processing illustrated in FIG. 11 will be described. The processing of FIG. 11 is executed at a predetermined timing (e.g., once per day).

(S21) The prediction unit 130 refers to the RAID management table 111 to select a single RAID group.

(S22) The prediction unit 130 refers to the storage unit 110 and checks a use ratio of the logical capacity of the RAID group selected in S21. For example, in a case where the RAID group ID is "G1", a ratio of the capacity used for the data preservation to the logical capacity 800 GB available by a user is the use ratio of the logical capacity.

(S23) The prediction unit 130 determines whether the use ratio of the logical capacity is greater than or equal to a threshold value. For example, the threshold value is 80%. When the use ratio is greater than or equal to the threshold value, the processing proceeds to S24. When the use ratio is less than the threshold value, the processing is ended. When data for a single SSD is preserved without using the RAID, the prediction unit 130 performs the determination in S23 depending on whether the use ratio of the user capacity in the SSD is greater than or equal to the threshold value (in a case of being greater than or equal to the threshold value, the processing is caused to proceed to S24 and in a case of being less than the threshold value, the processing is ended).

(S24) The prediction unit 130 issues a log sense command to each SSD that belongs to the RAID group selected in S21. For example, when the RAID group is "G1", the prediction unit 130 issues the log sense command to the SSDs 211, 212, and 213.

(S25) The prediction unit 130 acquires an accumulated amount of written data and an operation time from each SSD as a reply to the log sense command issued in S24.

(S26) The prediction unit 130 predicts the maximum write amount within the warranty period of each SSD on the basis of Equation (1). The prediction unit 130 may acquire information of the warranty period from the selected SSD. In a case where the information of the warranty period of the SSD is stored in the storage unit 110 in advance, the information of the warranty period may be acquired from the storage unit 110. For example, when it is assumed that the write amount accumulated so far for the SSD 211 is X, the warranty period of the SSD 211 is T1, and the operation time of the SSD 211 is T2, the maximum write amount Y within the warranty period predicted for the SSD 211 may be calculated as $Y = X \times T1/T2$ by Equation (1). The prediction unit 130 may also similarly calculate the maximum write amount within the warranty period regarding the SSDs 212 and 213.

(S27) The extension processing unit 140 selects an SSD having the largest value of maximum write amount among the SSDs that belong to the relevant RAID group on the basis of the maximum write amount of each SSD predicted in S26.

(S28) The extension processing unit 140 calculates the upper limit of the extension amount when the user capacity is extended using the capacity allocated from the spare capacity, on the basis of the TBW management table of each SSD selected in S27. For example, a case where the SSD 211 is selected in S27 and the maximum write amount Y predicted for the SSD 211 is 0.8 PB is considered. In this case, the extension processing unit 140 refers to the TBW management table 112 corresponding to the SSD 211 and identifies the user capacity having the largest value among the user capacities at which the TBW becomes larger than Y=0.8 PB. According to the TBW management table 112, the largest value of the user capacity is 480 GB. For that reason, the extension processing unit 140 calculates the upper limit of the extension amount when the user capacity is extended using the capacity allocated from the spare capacity in the SSD 211 as 480 GB (maximum value of the user capacity after extension)−400 GB (current user capacity)=80 GB. The extension processing unit 140 registers the calculated upper limit of extension amount in the extension limit management table 113 in association with the RAID group ID of the RAID group selected in S21.

As described above, the extension processing unit 140 selects the SSD having the largest value of predicted maximum write amount within the warranty period among respective SSDs that belong to the RAID group and determines the upper limit of extension amount of each SSD that belongs to the RAID group. This is because uniform capacity is allocated as the user capacity in respective SSDs constituting a RAID and in this case, the upper limit of extension amount is determined by the SSD having the largest value of the predicted maximum write amount and thus, a risk that the accumulated amount of written data exceeds the TBW in any of the SSDs that belong to the RAID group may be reduced.

The reason to perform the determination on the use ratio of the logical capacity in S23 is that it may be determined that, as the use ratio becomes higher, a possibility of a shortage of the user capacity becomes higher and a possibility of hoping to extend the user capacity by the user becomes higher in the future. By determining the upper limit of the extension amount in advance before the user hopes to extend the user capacity, the upper limit of the extension amount may be provided when the user hopes to extend the user capacity.

The procedural sequences of FIG. 11 are executed for all RAID groups (excluding the spare RAID that does not belong to the RAID group) registered in the RAID management table 111. The processing of FIG. 11 is applicable to a case where the warranty periods of respective SSDs that belong to the RAID group are different.

Figure 12:
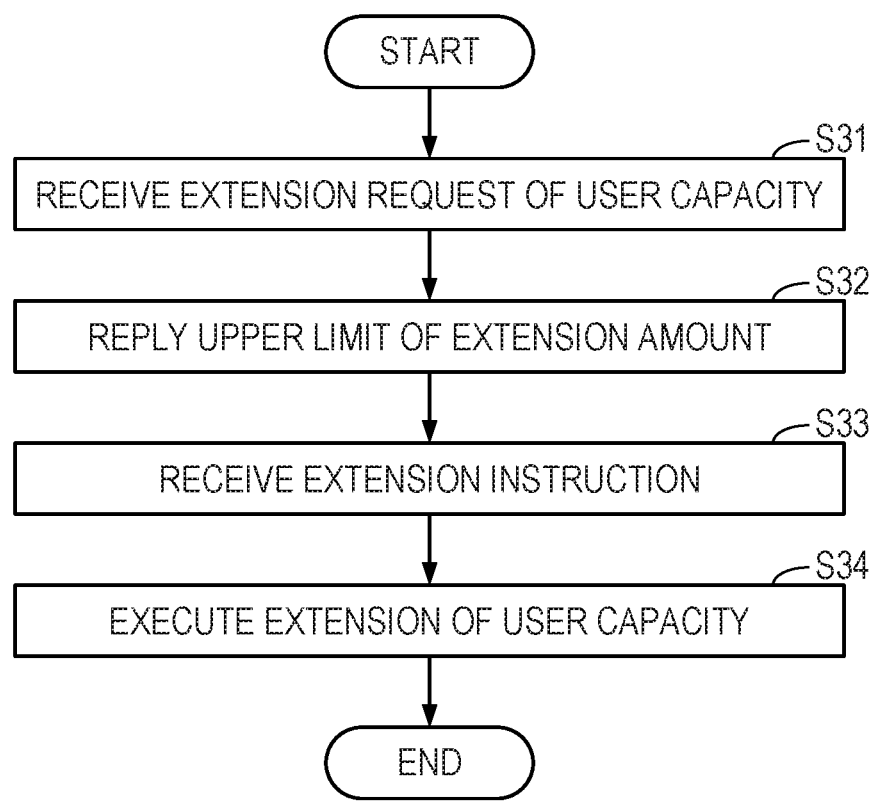
FIG. 12 is a flowchart illustrating an example of extension processing.

FIG. 12 is a flowchart illustrating an example of extension processing. Hereinafter, descriptions will be made on the processing illustrated in FIG. 12. (S31) The extension processing unit 140 receives an extension request of user capacity for a certain RAID group from the management server 20. The extension request contains information designating a RAID group.

(S32) The extension processing unit 140 refers to the extension limit management table 113 stored in the storage unit 110 and acquires the upper limit of extension amount for the designated RAID group. The extension processing unit 140 replies the upper limit of extension amount for each SSD of the relevant RAID group to the management server 20.

(S33) The extension processing unit 140 receives an extension instruction from the management server 20. The extension instruction contains the extension amount that the user hopes. In a case where the instructed extension amount is greater than the upper limit of extension amount, the extension processing unit 140 may transmit an error message to the management server 20. That is, when the extension amount designated from the user is less than or equal to the upper limit value of the extension amount, the extension processing unit 140 permits the extension, and otherwise, when the extension amount designated from the user is greater than the upper limit value, the extension processing unit 140 does not permit the extension.

(S34) The extension processing unit 140 executes the extension of the user capacity. For example, the extension processing unit 140 transmits an extension instruction to allocate a portion of the spare capacity to the user capacity, to respective SSDs that belong to the relevant RAID group. With this, the user capacity of each SSD is extended and the logical capacity of the RAID group is extended. Then, the processing is ended.

The upper limit of extension amount acquired in S32 is an upper limit of physical extension amount per single SSD. For that reason, the extension processing unit 140 may reply the upper limit value (upper limit of logical extension amount) converted into the logical capacity in the logical volume, as the upper limit value to be replied to the management server 20 in S32. For example, the upper limit of the physical extension amount per single SSD is 80 GB regarding the RAID group having the RAID group ID "G1" according to the extension limit management table 113. The type of the RAID group is RAID5. Accordingly, when the upper limit is converted into the logical capacity, 160 GB is the upper limit of the logical extension amount. In this case, the logical extension amount that the user hopes is included in the management instruction by the management server 20 in S33. Thus, when the instructed logical extension amount is greater than the upper limit of the logical extension amount (160 GB), the extension processing unit 140 may transmit an error message to the management server 20.

Figure 13:
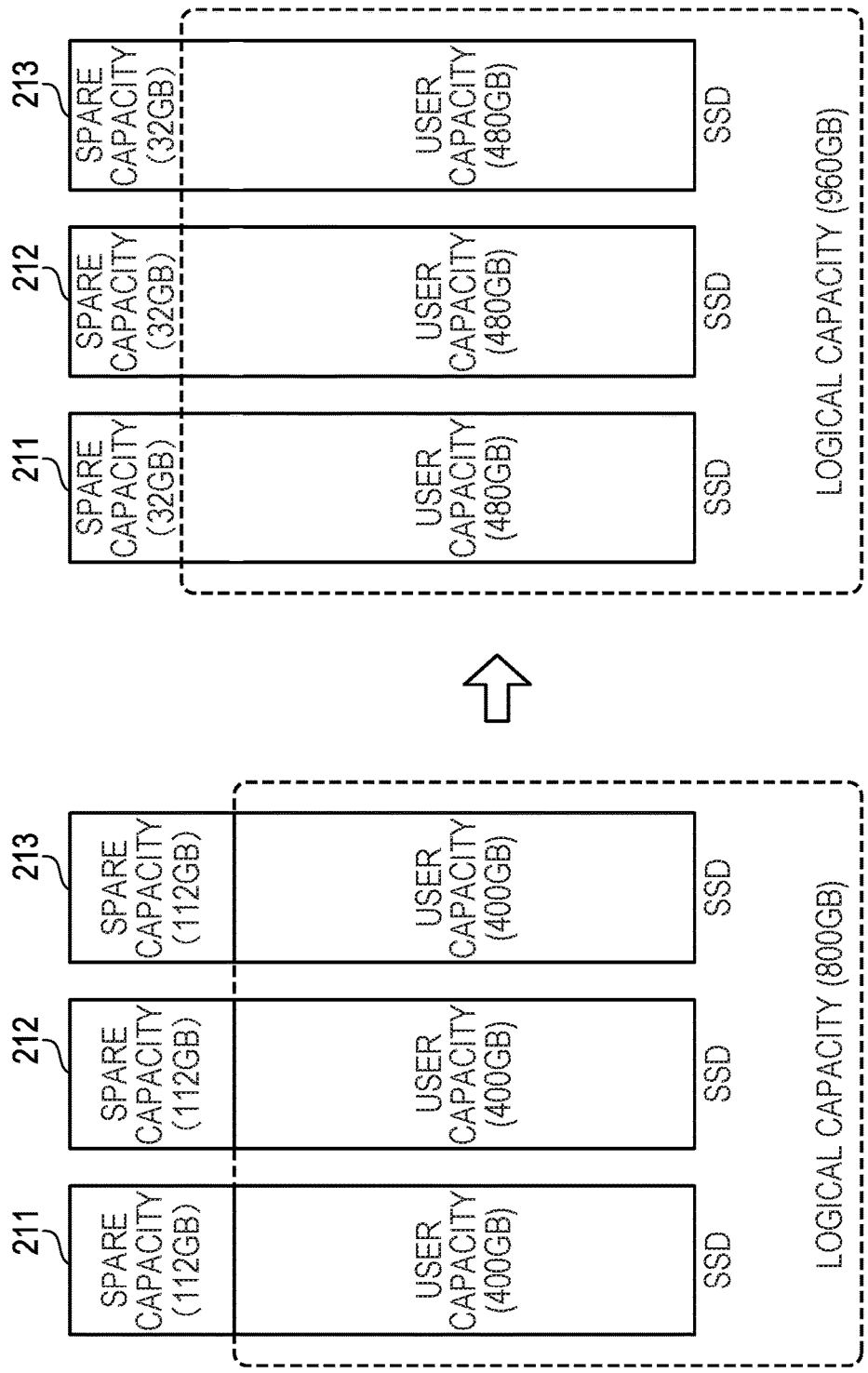
FIG. 13 is a diagram illustrating a specific example of user capacity extension.

FIG. 13 is a diagram illustrating a specific example of the extension of user capacity. In FIG. 13, descriptions will be made on a specific example of extension processing of the user capacity in the SSDs 211, 212, and 213 that belong to a single RAID group. The RAID type of the RAID group is RAID5. As described above, a total capacity of each of the SSDs 211, 212, and 213 is 512 GB. The logical capacity of the RAID group is 800 GB and the user capacity and the spare capacity of each of the SSDs 211, 212, and 213 are 400 GB and 112 GB, respectively. It is assumed that the warranty period of the SSDs 211, 212, and 213 is five years. It is also assumed that the accumulated amount of written data of each of the SSDs 211, 212, and 213 for three years is approximately 0.5 PB.

The prediction unit 130 issues a log sense command to the SSDs 211, 212, and 213 and acquires the accumulated amount of written data and the operation time from the SSDs 211, 212, and 213. The prediction unit 130 calculates the predicted maximum write amount within the warranty period for each of the SSDs 211, 212, and 213. In this case, the predicted maximum write amount within the warranty period regarding the SSD 211 is approximately 0.5 PB×5 years/3 years=0.83 PB. Similarly, the prediction unit 130 also calculates the predicted maximum write amount within the warranty period regarding the SSDs 212 and 213.

The extension processing unit 140 selects the SSD having the largest value of the predicted maximum write amount within the warranty period among the SSDs 211, 212, and 213. For example, it is assumed that the SSD having the largest value of the predicted maximum write amount within the warranty period among the SSDs 211, 212, and 213 is the SSD 211. In this case, the extension processing unit 140 selects SSD 211.

Then, the extension processing unit 140 determines the upper limit of the extension amount for the SSD 211 on the basis of the fact that the predicted maximum write amount within the warranty period for the SSD 211 is 0.83 PB. According to TBW management table 112 corresponding to the SSD 211, the largest value of the user capacity at which the TBW is not lower than 0.83 PB is 480 GB. For that reason, the extension processing unit 140 determines 80 GB (480 GB−400 GB) as the upper limit of the extension amount per single SSD that belongs to the relevant RAID group.

For that reason, in the RAID group, when the user capacity is extended up to the maximum using the spare capacity, the user capacity per single SSD of the SSDs 211, 212, and 213 becomes 480 GB. Then, the logical capacity becomes 480×2=960 and the capacity is extended by 160 GB from the capacity of 800 GB before the extension. The spare capacity of each of the SSDs 211, 212, and 213 after the extension is 32 GB.

As such, when the user capacity is extended using the spare capacity of the SSD for wear leveling, the CM 100 limits the extension amount in consideration of the reduction of the TBW accompanied by the reduction of the spare capacity such that the TBW does not become lower than the predicted maximum write amount within the warranty period. With this, it is possible to maintain the reliability of data preservation.

Figure 14:
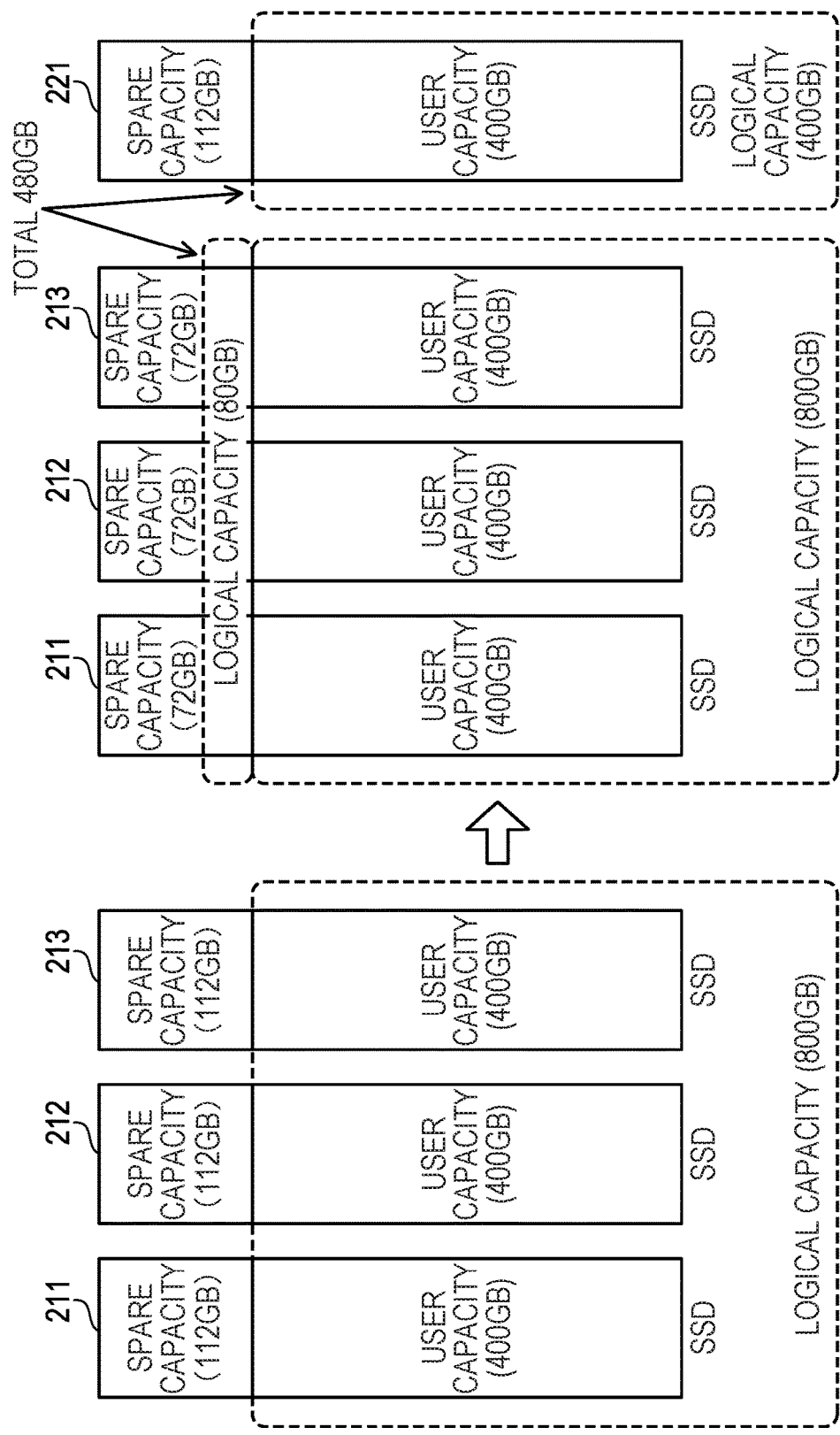
FIG. 14 is a diagram illustrating an example of an addition of a logical capacity.

FIG. 14 is a diagram illustrating an example of an addition of logical capacity. A case where the CM 100 receives an instruction to add the logical capacity which exceeds the upper limit, which has been described in the second embodiment, from the management server 20 may also be considered. For example, it corresponds to a case where the CM 100 receives an instruction to add the logical capacity which exceeds the upper limit of extension amount of 80 GB (160 GB when being converted into the logical capacity) in the RAID group constituted with the SSDs 211, 212, and 213. In FIG. 14, a case where an instruction to add the logical capacity of 480 GB is received is exemplified. In this case, as exemplified in the second embodiment, for example, the capacity of 80 GB of the capacity to be added is secured using the spare capacity of the SSDs 211, 212, and 213. The remaining capacity of 400 GB of the capacity to be added may be secured from the spare SSD 221.

As such, the CM 100 may combine the capacity securable from the spare capacities of the SSDs 211, 212, and 213 and the capacity of the spare SSD 221 and prepare the logical volume which secures new logical capacity (480 GB). Accordingly, the spare capacities of the SSDs 211, 212, and 213 may become available and thus, reduce an excess spare capacity of each SSD, and improve use efficiency of each SSD. With this, it is possible to reduce the required number of SSDs for securing a certain logical capacity.

In the second embodiment, a case where the DE 200 is equipped with the SSDs is illustrated. However, without being limited thereto, the second embodiment may be realized by a storage device as long as the storage device has an upper limit on the number of times of writing. The information processing of the first embodiment may be realized by causing a processor used as the control unit 1*b* to execute a program. The information processing of the second embodiment may be realized by causing the processor 101 to execute a program. It may be considered that the storage control device 1 and the CM 100 are provided with a computer including a memory and a processor. The program may be recorded in a computer-readable recording medium.

For example, a recording medium (e.g., recording media 9 and 11) having the program recorded therein may be distributed and thus, the program may be circulated. A computer may download the program from another computer (e.g., the management server 20). The computer may store (install), for example, the downloaded program or the program read from the recording-medium in the storage device such as the RAM 102 or the NVRAM 103, and read the program from the storage device to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device, comprising:
  a memory configured to
    store therein management information representing a relationship between a user capacity of a storage device capable of being allocated to a user and a total amount of writable data of the storage device within a warranty period of the storage device when a spare capacity secured for a wear leveling is allocated to extend the user capacity of the storage device; and
  a processor coupled to the memory and configured to
    acquire a current user capacity and a current spare capacity from the storage device,
    predict, at a predetermined timing, a maximum write amount of the storage device within the warranty period on basis of an accumulated amount of data written into the storage device and an operation time of the storage device, and
    restrict, when the user capacity is extended using the spare capacity, an extension amount of the user capacity on basis of the relationship represented in the management information stored in the memory such that the total amount of writable data after the extension of the user capacity does not become less than the maximum write amount.

2. The storage control device according to claim 1, wherein
  the processor is configured to
    obtain an upper limit value of the extension amount under condition that the total amount of writable data after the extension is greater than or equal to the maximum write amount,
    permit a first extension of the user capacity when the extension amount of the first extension is less than or equal to the upper limit value, and
    reject the first extension when the extension amount of the first extension exceeds the upper limit value.

3. The storage control device according to claim 1, wherein
  the storage device includes a plurality of storage devices, and
  the processor is configured to
    predict the maximum write amount of each of the plurality of storage devices,
    obtain a largest value among the predicted maximum write amounts of the plurality of storage devices, and
    restrict the extension amount of the user capacity of each of the plurality of storage devices on basis of the largest value when a logical storage area prepared using the user capacity of each of the plurality of storage devices is extended using the spare capacity of each of the plurality of storage devices.

4. The storage control device according to claim 1, wherein
  the predetermined timing is a timing at which a use ratio of the user capacity is greater than or equal to a predetermined threshold value, and the use ratio of the user capacity is a ratio of capacity used for data preservation to a logical capacity available by the user.

5. The storage control device according to claim 1, wherein the management information is represented as a graph in the memory.

6. The storage control device according to claim 1, wherein a portion of a free capacity rather than the spare capacity is allocated to extend the user capacity when the free capacity is present in the storage device.

7. The storage control device according to claim 1, wherein the maximum write amount is obtained by the accumulated amount of written data multiplied by a value in which the warranty period is divided by the operation time.

8. A non-transitory computer-readable recording medium having stored therein a program that causes a computer to execute a process, the process comprising:

storing in a memory management information representing a relationship between a user capacity of a storage device capable of being allocated to a user and a total amount of writable data of the storage device within a warranty period of the storage device when a spare capacity secured for a wear leveling is allocated to extend the user capacity of the storage device;

acquiring, from the storage device, a current user capacity and a current spare capacity of the storage device;

predicting, at a predetermined timing, a maximum write amount of the storage device within the warranty period on basis of an accumulated amount of data written into the storage device and an operation time of the storage device; and restricting, when the user capacity is extended using the spare capacity, an extension amount of the user capacity on basis of the relationship represented in the management information stored in the memory such that the total amount of writable data after the extension of the user capacity does not become less than the maximum write amount.

* * * * *